(12) United States Patent
Steward et al.

(10) Patent No.: US 10,399,727 B2
(45) Date of Patent: Sep. 3, 2019

(54) LIGHTWEIGHT BASE FOR CARBONATED BEVERAGE PACKAGING

(71) Applicant: THE COCA-COLA COMPANY, Atlanta, GA (US)

(72) Inventors: Sterling Lane Steward, Douglasville, GA (US); Venkat Govindarajan, Duluth, GA (US); Martin Geithmann, Ottawa Hills, OH (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 15/500,263

(22) PCT Filed: Jul. 31, 2015

(86) PCT No.: PCT/US2015/043257
§ 371 (c)(1),
(2) Date: Jan. 30, 2017

(87) PCT Pub. No.: WO2016/019318
PCT Pub. Date: Feb. 4, 2016

(65) Prior Publication Data
US 2017/0217625 A1    Aug. 3, 2017

Related U.S. Application Data

(60) Provisional application No. 62/032,428, filed on Aug. 1, 2014.

(51) Int. Cl.
*B65D 1/02* (2006.01)
*B29C 49/22* (2006.01)
(Continued)

(52) U.S. Cl.
CPC ............ *B65D 1/0215* (2013.01); *B29C 49/22* (2013.01); *B65B 3/022* (2013.01); *B65D 1/0207* (2013.01);
(Continued)

(58) Field of Classification Search
CPC .. B65D 1/0276; B65D 1/0284; B65D 1/0207; B65D 1/0261–0284; B65D 1/0215;
(Continued)

(56) References Cited

U.S. PATENT DOCUMENTS

| | | | |
|---|---|---|---|
| 4,330,579 A | 5/1982 | Ota et al. | |
| 4,392,055 A | 7/1983 | Whitney | |

(Continued)

FOREIGN PATENT DOCUMENTS

| | | |
|---|---|---|
| DE | 102004020185 A1 | 11/2005 |
| EP | 2163372 A1 | 3/2010 |

(Continued)

OTHER PUBLICATIONS

JP 5239480B2 translation (Year: 2009).*
(Continued)

*Primary Examiner* — Scott R. Walshon
*Assistant Examiner* — Jasper Saberi
(74) *Attorney, Agent, or Firm* — Eversheds Sutherland (US) LLP

(57) ABSTRACT

This disclosure provides generally container base designs for use in packaging carbonated beverages and new containers that incorporate the base design. It has been found that improved physical and mechanical properties such as good stress crack performance can be achieving while improved light weighting and potential cost savings. The particular base and container designs are generally applicable to carbonated soft drink (CSD) containers, and can be used with containers of any size and with any type of base form such as petaloid or champagne base forms.

22 Claims, 7 Drawing Sheets

(51) Int. Cl.
  *B65B 3/02* (2006.01)
  *B65D 23/02* (2006.01)
  *B65D 23/08* (2006.01)
  *B29C 49/12* (2006.01)
  *B29K 67/00* (2006.01)
  *B29L 31/00* (2006.01)

(52) U.S. Cl.
  CPC ......... *B65D 1/0246* (2013.01); *B65D 1/0261* (2013.01); *B65D 1/0284* (2013.01); *B65D 23/02* (2013.01); *B65D 23/0821* (2013.01); *B29C 49/12* (2013.01); *B29K 2067/003* (2013.01); *B29K 2995/0067* (2013.01); *B29L 2031/7158* (2013.01)

(58) Field of Classification Search
  CPC ... B29C 49/22; B65B 3/022; B29K 2067/003; B29L 2031/7158
  See application file for complete search history.

(56) References Cited

U.S. PATENT DOCUMENTS

| | | | | |
|---|---|---|---|---|
| 4,529,645 | A | * | 7/1985 | Berg .................. C08J 5/18 |
| | | | | 428/298.7 |
| 4,978,015 | A | | 12/1990 | Walker |
| 5,024,339 | A | * | 6/1991 | Riemer .............. B65D 1/0284 |
| | | | | 215/375 |
| 5,906,286 | A | * | 5/1999 | Matsuno ............ B29C 49/12 |
| | | | | 215/373 |
| 5,989,661 | A | * | 11/1999 | Krishnakumar ........ B29C 45/26 |
| | | | | 215/382 |
| 2004/0000533 | A1 | * | 1/2004 | Kamineni ............ B65D 1/0276 |
| | | | | 215/373 |
| 2005/0260371 | A1 | | 11/2005 | Shi et al. |
| 2008/0257855 | A1 | | 10/2008 | Patel |
| 2008/0257856 | A1 | * | 10/2008 | Melrose ............ B65D 1/0223 |
| | | | | 215/381 |
| 2008/0274318 | A1 | * | 11/2008 | Takada ................ B65D 1/0284 |
| | | | | 428/36.9 |
| 2010/0109206 | A1 | | 5/2010 | Hutchinson et al. |
| 2011/0217494 | A1 | * | 9/2011 | Lane .................... B65D 1/0276 |
| | | | | 428/35.7 |
| 2016/0297558 | A1 | * | 10/2016 | Strasser ............ B65D 1/0284 |

FOREIGN PATENT DOCUMENTS

| | | |
|---|---|---|
| GB | 1341845 A | 12/1973 |
| GB | 1341845 A | 5/1997 |
| JP | H04215936 A | 8/1992 |
| JP | 2001072032 A | 3/2001 |
| JP | 201520135 A | 10/2001 |
| JP | 2008514521 A | 5/2008 |
| JP | 2008540186 A | 11/2008 |
| JP | 2013523549 A | 6/2013 |
| JP | 5239480 B2 * | 7/2013 |
| WO | 1999/007607 A1 | 2/1999 |
| WO | 2008095842 A1 | 8/2008 |

OTHER PUBLICATIONS

PCT International Search Report and Written Opinion for International Application No. PCT/US2015/043257 dated Oct. 22, 2015.
European Search Report issued in Application No. 15827487.8, completed Nov. 6, 2017 (7 pages).
Third Party Observation in EP 15827166.8, Mar. 21, 2019, pp. 1-14.
Third Party Submission under 37 CFR 1.290 in U.S. Appl. No. 15/500,250, filed Apr. 16, 2019 Notification Date.
Third Party Observation in EP 15827487.8, Apr. 2, 2019, pp. 1-7.
Third Party Observation in U.S. Appl. No. 15/500,250, Apr. 11, 2019, pp. 1-9.
Office Action in JP2017-500999, dated Apr. 19, 2019, pp. 1-7.

* cited by examiner

LIGHTWEIGHT BASE FOR CARBONATED BEVERAGE PACKAGING

CROSS REFERENCE TO RELATED APPLICATIONS

This application is a 35 U.S.C. § 371 National stage application of International Patent Application No. PCT/US2015/043257, filed Jul. 31, 2015, which claims the benefit of priority from U.S. Provisional Application No. 62/032,428, filed Aug. 1, 2014, which is incorporated herein by reference in its entirety.

TECHNICAL FIELD

This disclosure relates to bases for carbonated beverage packaging that assist in providing light weight properties to the beverage packaging.

BACKGROUND

Polyethylene terephthalate or "PET" polymers and copolymers are widely used to manufacture bottles for beverages such as water, juices, carbonated soft drinks (CSD), and the like, because they generally possess good mechanical and gas barrier properties. Over this time, container designs have been improved and optimized for increasingly lighter weights and affordability. Such bottles are conventionally prepared using a stretch blow molding process. Stretch blow molding first involves injecting the PET resin into a preform injection mold designed according to the desired final bottle shape and size and the PET polymer properties. The preform is subsequently stretch blow molded in which the heated preform is both blown and stretched into the final container shape using compressed air and an axial stretching rod.

One significant feature in container design as it relates to CSD bottle performance, mechanical properties, and the stretch blow molding process, for example, is the design of the bottle base. Base design has been found to influence to a substantial degree, for example, the ability to successfully light weight a bottle. Base design also influences bottle performance such as stress crack performance, and other features. Base design can also improve the desired physical robustness of the bottle, and enhance processing features such as the maintenance of bottle integrity during the stretch blow molding process.

Therefore, improved bottle and base designs are needed that also enable improved light weighting and which allow light weighted bottles to achieve good stress crack performance, and good drop failure performance, and other features. Base designs that can improve generally the desired physical robustness of the bottle, regardless of its size, and enhance processing features when used with various PET resin compositions are also of interest. It would be preferable if such new bottle designs and methods also could be applicable to a variety of container polymers such as nylons and nylon blends, in addition to PET resin containers.

SUMMARY OF THE INVENTION

This disclosure provides generally new containers, methods, and container base designs for use in packaging carbonated beverages that provide improved physical and mechanical properties such as good stress crack performance, while also achieving improved light weighting and potential cost savings. The particular base and container designs and methods are particularly applicable to carbonated soft drink (CSD) containers, and can be used with containers of any size less than 5 liters. Further the CSD container base design and properties disclosed herein are application to a petaloid base, a champagne base, or any free standing base design.

Despite the light weight design, the disclosed container base is also generally suitable for production at high operating output speeds found in current state-of-the-art bottle blow-molders. Other structural and functional features that can be found in the blow molded bottles according to this disclosure include base designs that perform successfully for very lightweighted designs, including using the lightest possible weights to fabricate the bottle. The disclosed CSD bottle bases also have a good resistance to drop failures, stress cracking resistance, and good base clearance after thermal stability tests, when fabricated based on the design parameters described herein.

Therefore, this disclosure also describes bases for bottles and methods that afford improved crystallinity, light weighting, stress crack performance, and physical performance, among other features. Among other things, disclosed herein is a base for a carbonated soft drink (CSD) container, the base comprising a petaloid base or a champagne base design form, wherein the base is characterized by the following features:

a) an area/weight ratio (A/W), wherein A/W is from about 2200 to about 3400 sq mm/g;

b) a weight percentage/area percentage ratio (W %/A %), wherein W %/A % is from about 0.9 to about 1.3;

c) a first percent (%) crystallinity measured around the gate diameter (within 10 mm), wherein the first percent crystallinity is greater than or about 10%;

d) a second percent (%) crystallinity measured at a distance of greater than or about 15 mm from the gate, wherein the second percent crystallinity is at least or about 70% of the sidewall crystallinity;

e) a percent (%) trans content measured around the gate diameter (within 10 mm), wherein the percent trans content is at least or about 65%; and/or f) a thickness ratio of less than or about 3.5 (thickness ratio is thickness at 5 mm from gate dividing by thickness at 10 millimeters from the gate).

Specific and unexpected causes of diminished physical performance for container bases have been ascertained, and methods to overcome these problems have been discovered. While the bottle bases according to this disclosure can and typically have all of these features, they also generally can have at least 2, at least 3, at least 4 or at least 5 of these listed features. In another aspect, while the bottle bases according to this disclosure may and typically do have all of these features, they also can generally have 2, 3, 4, 5, or all of these features recited above.

These and other aspects and embodiments are presented in the following description and drawings.

BRIEF DESCRIPTION OF THE DRAWINGS

The various aspects and embodiments of the CSD base design of the present disclosure can be readily understood by reference to the figures provided herein and described below.

Figure 2A:
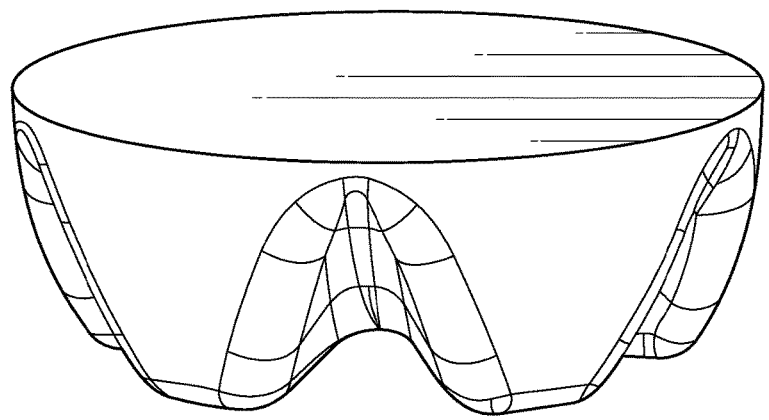
Figure 2B:
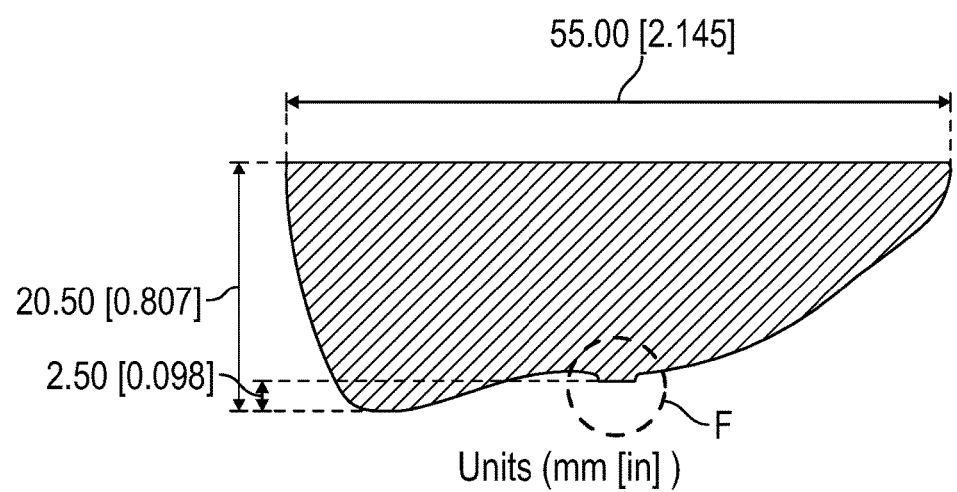

FIG. 2A and FIG. 2B illustrates a base design used for a small sparkling package designed according to this disclosure which passed the industry standard ISBT stress cracking method testing requirements, including stress cracking at a base weight of 1.7 g to 1.9 g.

Figure 3:
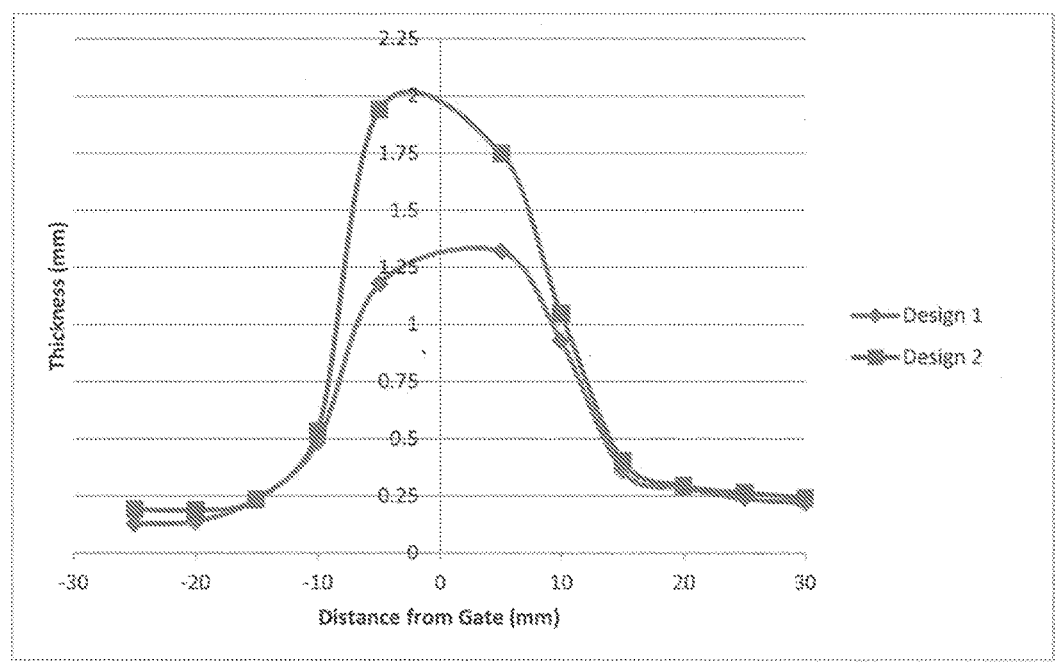

FIG. 3 illustrates the results of the base thickness (mm) plotted against the distance from the gate (mm), for both the new Design 1 (♦) and Design 2 (■) bottle bases and demonstrates the substantially increased thickness of the Design 2 bottle base near the gate as compared the Design 1 bottle base.

Figure 4:
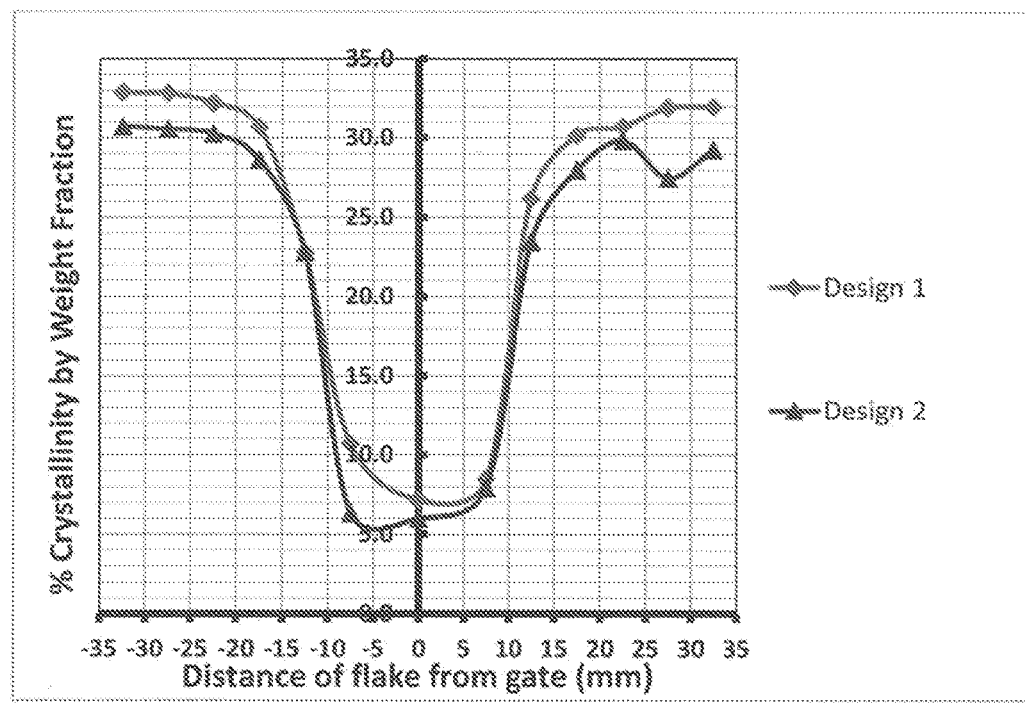

FIG. 4 illustrates the results of the percent (%) crystallinity plotted against the distance from the gate (mm) of the sample flake used to test crystallinity, for both the new Design 1 (♦) and Design 2 (▲) bottle bases. The higher orientation in the base results in increased density enhances base performance.

Figure 5:
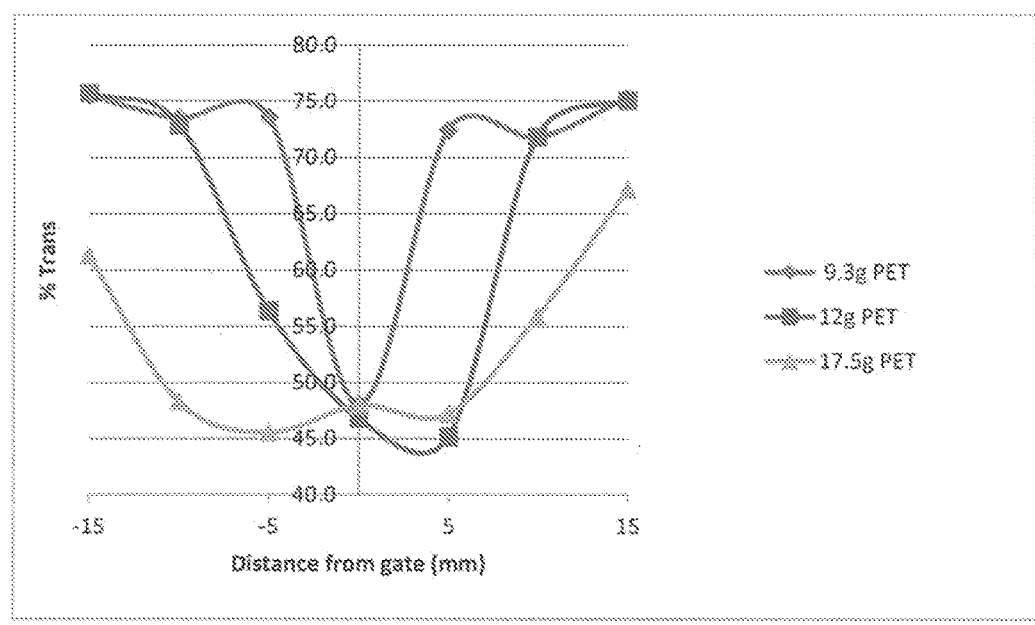

FIG. 5 illustrates the percent orientation (% trans content) measured at various locations from the gate along a vertical cross section for the following bottle bases: 9.3 g 200 mL PET new design bottle (♦) (B2); 200 mL PET standard (conventional) design bottle (■) (C1); and 300 mL standard (conventional) design bottle (▲) (C3).

Figure 6:
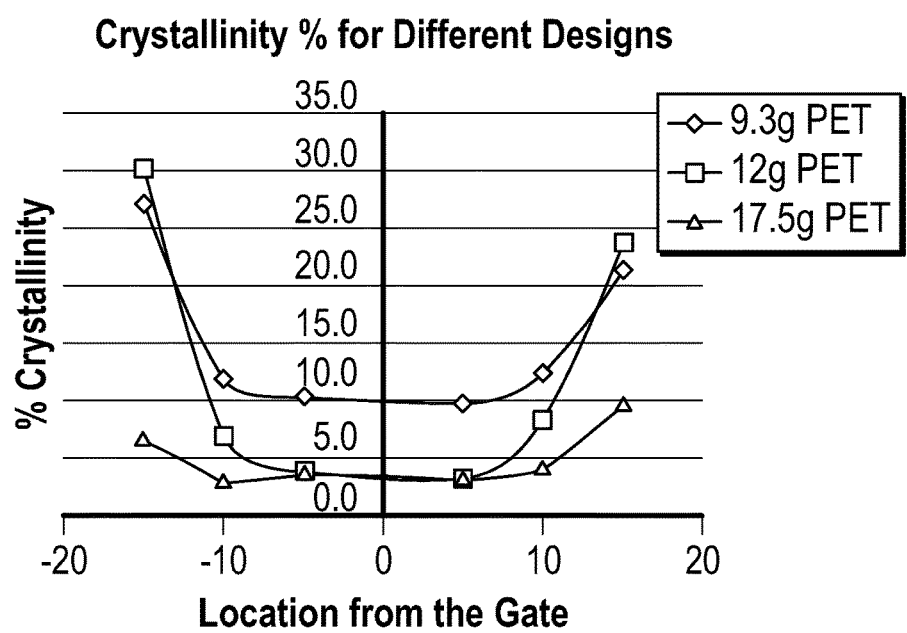

FIG. 6 illustrates the percent (%) crystallinity measured at various locations from the gate along a vertical cross section for the bottles shown in FIG. 5, specifically: 9.3 g 200 mL PET new design bottle (♦) (B2); 200 mL PET standard (conventional) design bottle (■) (C1); and 300 mL standard (conventional) design bottle (▲) (C3).

Figure 7:
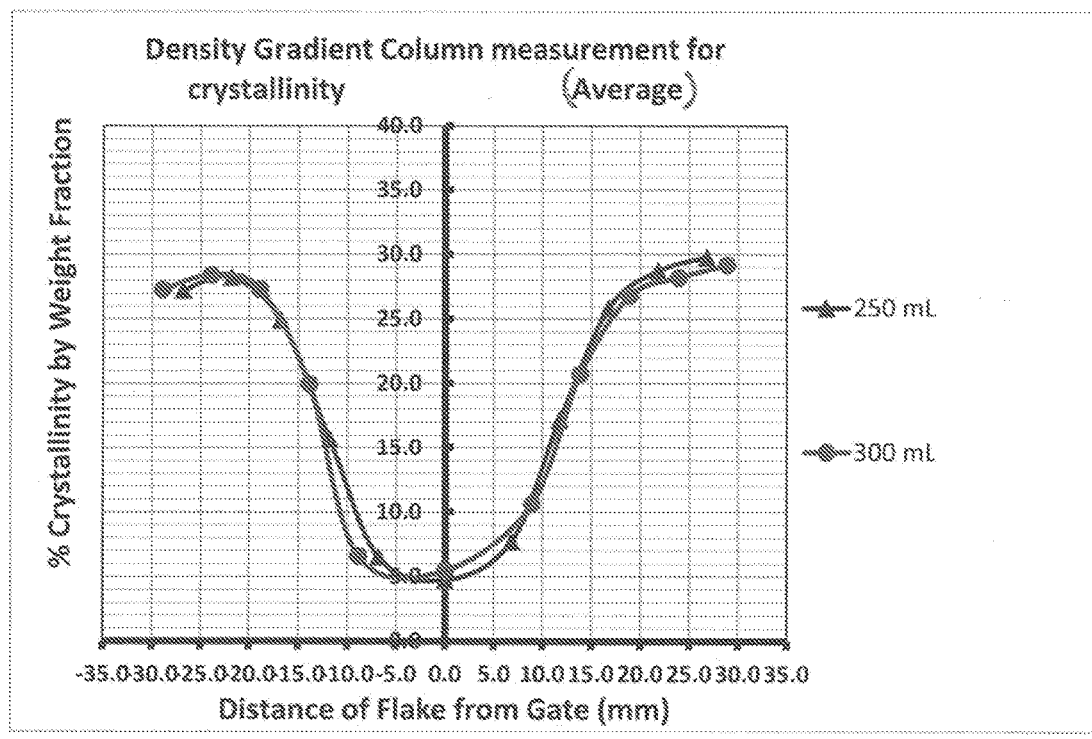

FIG. 7 illustrates the results of the percent (%) crystallinity (by weight fraction) plotted against the distance from the gate (mm) of the sample flake used to test crystallinity, for two test bottle bases, a 250 mL PET new design bottle (▲) (B3) and 300 mL new design bottle (●) (B6).

DETAILED DESCRIPTION OF THE INVENTION

Aspects of this disclosure are disclosed that provide new bases and containers comprising the bases, as well as providing preforms and methods that improve the overall physical performance of the bases. The design principles outlined herein are applicable to any base used in a carbonated soft drink (CSD) container or bottle, such as a petaloid base or a champagne base. Reference is made to the examples and figures provided herein for a full appreciation of the scope of the disclosure.

As used herein, "crystallinity" and "percent crystallinity" measure the alignment or partial alignment of polymer chains in the fabricated bottle that result due to the preform design, structure, and composition, as well as fabrication methods such as mechanical stretching and cooling. More highly crystalline polymers are less permeable, exhibit lower creep and are generally more optically transparent. In this disclosure, crystallinity is generally reported as a percent and is measured by sampling the bottle at the base at known distances from the gate. Percent crystallinity is estimated according to density measurements using known methods, for example, as in ASTM D1505.

Also as used herein, the term "Carbonated Soft Drink (CSD)" container or bottle are used herein to refer to the containers of this disclosure that are designed for use under pressure, such as carbonation, without specific limitation as to the intended contents of the container. That is, any type of liquid contents that can be packaged under pressure can be used in accordance with the disclosure. Generally, the term "container" is used interchangeably with the terms "bottle" or "package" unless the context requires otherwise.

Among other things, this disclosure describes bases for bottles and methods that afford improved physical performance such as drop impact, base clearance, and stress cracking performance, which in turn impacts the overall physical performance of the container. Specifically disclosed herein is a base for a carbonated soft drink (CSD) container, wherein the base is characterized by the combination of features described hereinbelow.

Base design can dramatically affect physical performance, such as for example, drop impact, base clearance and stress cracking. Because a particular base design often determines the preform temperature and/or blow pressure employed in bottle blow molding, base design can also impact the overall physical performance of the container as well. For example, if forming a particular base correctly requires a relatively high preform temperature, then that particular base design may lead to slightly lower polymer orientation, and hence lower burst pressure, top load, and the like. Similarly, if a higher weight and/or thickness are required at the gate for better burst strength, then it may be possible to remove material from the container body, making it lighter in the body to accommodate the higher weight and thickness at the gate. Therefore, it is clear that base design is central to performance of pressurized container.

Figure 1:
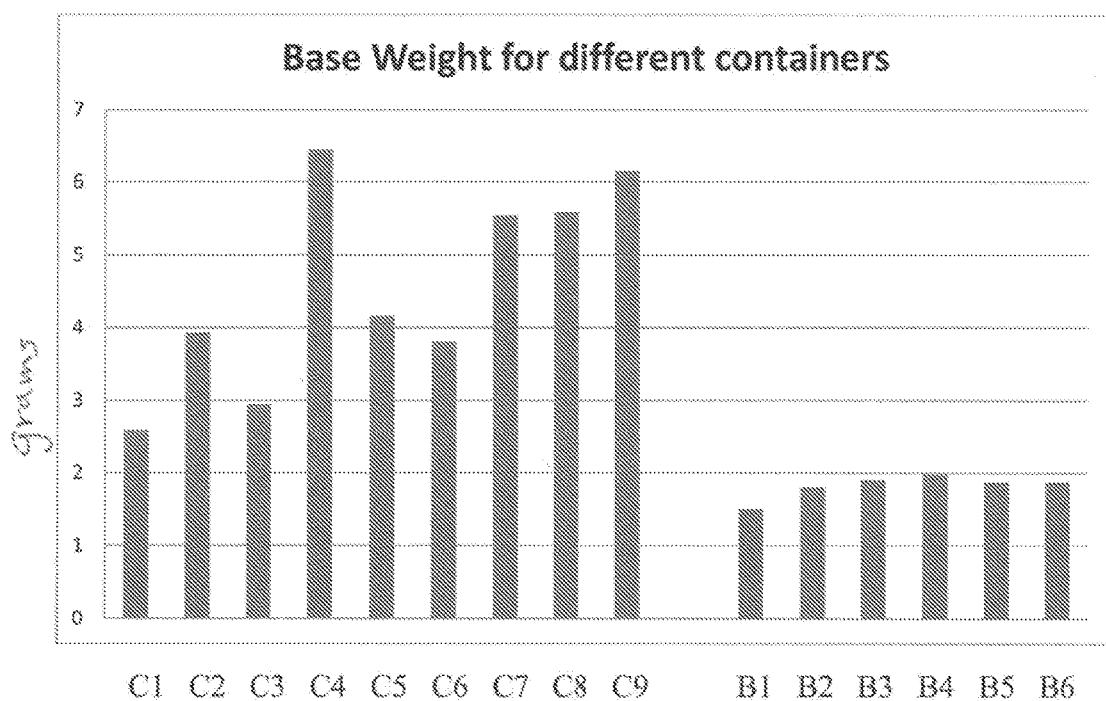
FIG. 1 demonstrates the base weight (g) for various containers or bottles, where the bottles labeled C1 through C9 are comparative examples of bottle bases that are not designed according to the light weighting principles of this disclosure. These comparative examples include both small (less than or equal to 400 mL) and larger (greater than 400 mL) bottles. Bottles 1 through 6 in FIG. 1 designated B1 through B6 include bases designed according to the light weighting principles of this disclosure, and their base weights are seen to be substantially lower than the comparative examples of bottles of the same size. Table 1 provides data on each of the comparative and exemplary bottles and bases in FIG. 1.

Some of the key characteristics or features of the base design include clearance height, foot length and width of the valleys, for example, generally, a particular combination of these features is what provides for good base performance. A survey of bottle bases used in various commercial containers demonstrates that the base weights can typically ranges from about 3 g to about 6 g for varying sized containers as shown in FIG. 1. FIG. 1 demonstrates the base weight for various containers or bottles. Comparative bottles and bases are labeled C1 through C9 and bottles and bases B1 through B6 include those bases designed according to the light weighting principles of this disclosure. Their base weights are seen to be substantially lower than the comparative examples of bottles of the same size. The following Table provides some additional information on each of the comparative and exemplary bottle bases in FIG. 1. Throughout the description, terms such as new or exemplary are used to describe the bases according to this disclosure, while terms such as standard or conventional are used to describe comparative bases. Although the exemplary bottles show are less than 400 mL bottles, it is noted that the design principles of this disclosure are applicable to greater than 400 mL bottles and bottles of any size, even up to 5 L bottles.

TABLE 1

Properties of containers presented in FIG. 1

| Example | Bottle | Weight (g) |
|---|---|---|
| C1 | 200 mL PET Std Design A | 12 |
| C2 | 200 mL PET Std Design B | 17.5 |
| C3 | 300 mL PET Std Design A | 17.5 |
| C4 | 300 mL PET Std Design A | 22.3 |
| C5 | 500 mL PET Std Design A | 22.3 |
| C6 | 600 mL PET Std Design A | 22.3 |
| C7 | 20 oz. PET Std Design A | 24 |
| C8 | 12 oz. PET Std Design A | 20 |
| C9 | 500 mL PET Std Design A | 24.6 |
| B1 | 200 mL PET New Design 1 | 8.3 |
| B2 | 200 mL PET New Design 1 | 9.3 |
| B3 | 250 mL PET New Design 1 | 9.3 |
| B4 | 250 mL PET New Design 1 | 10.3 |
| B5 | 250 mL PET New Design 2 | 9.6 |
| B6 | 300 mL PET New Design 1 | 9.95 |

Also illustrated in FIG. 1 are base weights for various small containers, generally meaning bottles having a nominal volume of less than or about 400 mL. As seen, the FIG. 1 bottles can range as low as 200 mL in volume. The exemplary bottle bases shown as B1 through B6, range in base weight from about 1.5 g to about 2.0 g. Even at these low base weights, these exemplary containers are expected to meet standard CSD container base performance such as drop impact, base clearance, and stress cracking.

According to an aspect of this disclosure, it has been discovered that improvements in drop impact, base clearance, stress cracking and other physical performance standards may be achieved in light weight bottles of any size, by enhancing the surface area-to-weight (area/weight) ratio (A/W) of the base. This is particularly evident when this A/W is combining an enhanced Material Distribution as described hereinbelow, and/or combined with any of the other design features disclosed herein. In an aspect, the surface area per weight measurements for the CSD containers described herein can vary within certain ranges. For example, the surface area per weight (A/W) can be from about 2200 to about 3400 sq mm/g, alternatively from about 2600 to about 3200 sq mm/g, or alternatively from about 2800 to about 3000 sq mm/g. Alternatively, still, the A/W ratio can be about 2200 sq mm/g, about 2300 sq mm/g, about 2400 sq mm/g, about 2500 sq mm/g, about 2600 sq mm/g, about 2700 sq mm/g, about 2800 sq mm/g, about 2900 sq mm/g, about 3000 sq mm/g, about 3100 sq mm/g, about 3200 sq mm/g, about 3300 sq mm/g, or alternatively about 3400 sq mm/g.

According to an additional aspect, it has been discovered that improvements in drop impact, base clearance and stress cracking can be achieved in light weight bottles of any size, by optimizing the Weight-to-Area ratio of the base, that is, the extent to which how uniformly the weight distribution of the base matches the area distribution of the base. This translates to matching the weight percentage W % and surface area percentage (SA % or simply, A %) of the base of the container, that is, calculating the ratio of W %/A %, which is referred to herein as Material Distribution in the base. It has also been surprisingly discovered that when the weight percentage W % and surface area percentage A % are close to unity, improvements in properties such as drop impact, base clearance and stress cracking can be achieved in light weight bottles of any size. This becomes especially evident when the enhanced Material Distribution is combined with any of the other design features disclosed herein.

According to an aspect of this disclosure, it has been discovered that the Material Distribution in the base plays a role in determining the bottle base performance characteristics such as drop impact, base clearance and stress cracking, particularly in light weight bottles of any size. This features is demonstrated in the tables below, which show the surface area per weight (A/W) (Area/Weight distribution) as well as the W %/A % ratio for the different bottle sections for 2 different bottle designs, a 200 mL PET standard design bottle base and a 200 mL (8.3 g) new design bottle base.

TABLE 2

Material Distribution features for a 200 mL PET standard design

| Bottle Section | Weight, g | Weight % | Area, sq mm | Area % | Ai | Area/g | (Area/g) * Ai | Wt/Area Ratio |
|---|---|---|---|---|---|---|---|---|
| Top | 2.5 | 17.9% | 1888 | 8.3% | 0.08 | 755 | 62 | 2.17 |
| Upper Bumper | 1.18 | 8.4% | 2903 | 12.7% | 0.13 | 2460 | 312 | 0.66 |
| Panel | 2.21 | 15.8% | 5529 | 24.2% | 0.24 | 2502 | 605 | 0.65 |
| Grip | 4.16 | 29.8% | 8367 | 36.6% | 0.37 | 2011 | 736 | 0.81 |
| Base | 3.93 | 28.1% | 4172 | 18.3% | 0.18 | 1062 | 194 | 1.54 |

TABLE 3

Material Distribution features for a 200 mL PET new design

| Bottle Section | Weight, g | Weight % | Area, sq mm | Area % | Ai | Area/g | (Area/g) * Ai | Wt/Area Ratio |
|---|---|---|---|---|---|---|---|---|
| Top | 2.24 | 34.8% | 6075 | 28.7% | 0.29 | 2712 | 777 | 1.21 |
| Panel | 1 | 15.5% | 4073 | 19.2% | 0.19 | 4073 | 782 | 0.81 |
| Grip | 1.7 | 26.4% | 6660 | 31.4% | 0.31 | 3918 | 1231 | 0.84 |
| Base | 1.5 | 23.3% | 4393 | 20.7% | 0.21 | 2929 | 607 | 1.12 |

A comparison of these data demonstrate that when the Weight/Area ratio, that is, the weight percentage W % to surface area percentage A % ratio (W %/A %), is substantially different from unity (1.0), an imbalance in material distribution is indicated. For example, in an aspect, the weight percentage W % to surface area percentage A % ratio (W %/A %) also can vary within certain ranges. For example, the W %/A % ratio of the disclosed bottle bases can be from about 0.85 to about 1.30, alternatively from about 0.95 to about 1.20, alternatively from about 1.00 to about 1.15, or alternatively, from about 1.05 to about 1.15. For example, the W %/A % ratio of the disclosed bottle bases can be about 0.85, about 0.90, about 0.95, about 1.00, about 1.05, about 1.10, about 1.15, about 1.20, about 1.25, or alternatively about 1.30. High performing light weight bases were also particularly found when the W %/A % ratio is close to or less than about 1.

Further to this aspect, the table below summarizes the "Base Ratio" (Weight/Area or specifically, W %/A % ratio for the base section) for several commercial packages as well as packages prepared according to the design of this disclosure.

TABLE 4

W %/A % ratio for the base section (base ratio) comparative (C series) and exemplary (B series) packages

| Example | Bottle | Base Ratio |
|---|---|---|
| C1 | 200 mL PET Std Design A, 12 g | 1.87 |
| C2 | 200 mL PET Std Design B, 17.5 g | 1.54 |
| C3 | 300 mL PET Std Design A, 17.5 g | 1.22 |
| C4 | 300 mL PET Std Design A, 22.3 g | 1.49 |
| C5 | 500 mL PET Std Design A, 22.3 g | 1.40 |
| C6 | 600 mL PET Std Design A, 22.3 g | 1.32 |
| C7 | 20 oz. PET Std Design A, 24 g | 1.42 |
| C8 | 12 oz. PET Std Design A, 20 g | 1.45 |
| C9 | 500 mL PET Std Design A, 24.6 g | 1.58 |
| B1 | 200 mL PET New Design 1, 8.3 g | 1.12 |
| B2 | 200 mL PET New Design 1, 9.3 g | 1.14 |
| B3 | 250 mL PET New Design 1, 9.3 g | 1.04 |
| B4 | 250 mL PET New Design 1, 10.3 g | 0.96 |
| B5 | 250 mL PET New Design 2, 9.6 g | 1.15 |
| B6 | 300 mL PET New Design 1, 9.95 g | 1.24 |

According to a further aspect, it has also been discovered that reduced or even minimized proportion of amorphous (un-oriented) polymer in certain sections of the base can provide further improvements in drop impact and the like in light weight bottles of any size. This is particularly evident when reduced or even minimized proportion of amorphous polymer, that is, increasing the proportion of crystalline polymer in certain sections of the base, is combined with an enhanced Material Distribution as described herein and/or any of the other features disclosed herein. Specifically, a percent (%) crystallinity can be measured at various sections of the base, and it was unexpectedly found that percent (%) crystallinity measured around the gate diameter (within 10 mm), wherein the first percent crystallinity is greater than or about 10% provides enhancements in drop impact and base clearance can be achieved in light weight bottles of any size. Generally the first percent crystallinity will be no more than about 20%. This crystallinity measured within 10 mm around the gate diameter may be referred to herein as a "first" percent (%) crystallinity.

In an aspect, the "first" percent (%) crystallinity as described herein can vary within certain ranges, wherein the first percent crystallinity is greater than or about 10%. For example, the first percent (%) crystallinity of the disclosed bottle bases can be at least or about 10%, at least or about 11%, at least or about 12%, at least or about 13%, at least or about 14%, or alternatively, at least or about 15%.

In still a further aspect, it has also been discovered that increasing the proportion of crystalline (oriented) polymer in other areas of the base, particularly further removed from the gate, also can provide further improvements in drop impact, stress cracking, and the like in light weight bottles of any size. This is particularly evident when increasing the proportion of crystalline polymer in the base sections further removed from the gate is combined with an enhanced Material Distribution as described herein and/or any of the other features disclosed herein. Specifically, it was unexpectedly found that when the percent (%) crystallinity in a section of the base measured at a distance of greater than or about 15 mm from the gate, also referred to herein as a "second" percent (%) crystallinity, is at least or about 70% of the sidewall crystallinity, enhancements in drop impact, base clearance and stress cracking can be achieved in light weight bottles of any size. Generally, the second percent (%) crystallinity can be up to about 80% of the sidewall crystallinity. According to one aspect, the second percent (%) crystallinity of the disclosed bottle bases can be can be at least or about 70% of the sidewall crystallinity, at least or about 72% of the sidewall crystallinity, at least or about 74% of the sidewall crystallinity, at least or about 76% of the sidewall crystallinity, or alternatively at least or about 78% of the sidewall crystallinity.

Further aspects of the disclosure provide that certain improvements in drop impact and the like in light weight bottles of any size when the amount of orientation (% Trans content) in the base adjacent to the gate is increased or boosted. Again, this is particularly apparent when increasing the percent trans content is combined with an enhanced Material Distribution as described herein and/or any of the other features disclosed herein. Specifically, when the percent (%) trans content measured around the gate diameter (within 10 mm), wherein the percent trans content is at least or about 65% then enhancements in drop impact, base clearance and the like can be achieved in light weight bottles of any size. Generally, the percent trans content can be up to about 80%. FIG. 5 and FIG. 6 provide percent (%) trans content data and percent (5) crystallinity, respectively, for following bottle bases: 9.3 g 200 mL PET new design bottle (♦) (B2); 200 mL PET standard (conventional) design bottle (■) (C1); and 300 mL standard (conventional) design bottle (▲) (C3). In this aspect, the Trans (oriented) and Gauche (unoriented amorphous) content could be measured using FTIR, and the % Trans can be determined as shown below. Specifically, the % Trans was measured at intervals of 5 mm from the gate, as shown in FIG. 5. The measurement instrument used was PerkinElmer Spectrum 400 FT-NIR Spectrometer with ATR capability.

$$\% \text{ trans} = ((A_{1340cm-1}/A_{1410cm-1})/((A_{1340cm-1}/A_{1410cm-1}) + (A_{1370cm-1}/A_{1410cm-1})))*100$$

A Absorbance peak height
1410 $cm^{-1}$ Reference band
1370 $cm^{-1}$ Gauche band
1340 $cm^{-1}$ Trans band In an aspect, the percent (%) trans content measured around the gate diameter (within 10 mm) also can vary within certain ranges. For example, the percent (%) trans content measured around the gate diameter (within 10 mm), can be from about 65% to about 85%.

According to a further aspect of the disclosure, it has also been discovered that the bases of this disclosure have a thickness ratio of the less than or about 3.5, where the thickness ratio is determined by dividing the thickness at 5 mm from gate by the thickness at 10 millimeters from the gate. The bases of this disclosure also can have a thickness ratio of the less than or about 3.5, less than or about 3.4, less than or about 3.3, less than or about 3.2, less than or about 3.1, less than or about 3.0, less than or about 2.9, less than or about 2.8, less than or about 2.7, less than or about 2.6, less than or about 2.5, less than or about 2.4, less than or about 2.3, less than or about 2.2, less than or about 2.1, or alternatively less than or about 2.0. Generally, the thickness ratio can be less than or about 3.0 or alternatively, less than or about 2.5.

According to a further aspect, the polymer of container and container base can comprise or can be made of a nylon, a polyester, or a polyamide, including various blends and co-polymers thereof. For example, the polymer can comprises or can be made of a material selected from nylon MXD6, a nylon blend comprising nylon MXD6, PET, poly(trimethylene furan-2,5-dicarboxylate) (PTF), also called poly(propylene furan-2,5-dicarboxylate) (PPF), poly (trimethylene terephthalate) (PTT), a polyethylene naphthalate (PEN)/PET co-polymer, a PEN and PET blend, a poly Glycolic Acid (PGA), PEF, and PET blend.

Because many polymers used to prepare CSD containers are crystallizable, orientation and crystallinity factor into the polymer and bottle performance. For example, PET is crystallizable polyester that can exist in different morphology states, such as semi-crystalline in resin pellets, amorphous in preforms, and oriented-crystalline in blown containers. Both orientation and crystallinity generally improve the container performance. Factors affecting orientation include Resin IV, Stretch Ratios, Stretching Speed and Stretching Temperature.

EXAMPLES

Example 1A. Stress Crack Performance for Design 1 and Design 2 Bases

Two base designs, referred to herein as Design 1 and Design 2, were prepared according to this disclosure and were tested for Stress Crack performance. Selected Design 1 and Design 2 base dimensions are outlined in the following table.

TABLE 7

Selected Design 1 and Design 2 base dimensions

| Description | Parameter | |
| --- | --- | --- |
| | Design 1 250-mL New Design 1 | Design-2 250-mL New Design 2 |
| Base height (mm) | 20.5 | 20.00 |
| Base clearance (mm) | 2.5 | 4.00 |
| Standing ring diameter (mm) | 39.9 | 37.00 |
| Strap width near gate (mm) [A] | 4 | 2.58 |
| Strap width near top (mm) [A] | 4 | 2.92 |
| Gate pad diameter (mm) | 7.64 | 6.36 |
| Strap Cutter Angle (°) | 60 | 36.09 |
| Strap Angle, from Horizontal (°) | 38 | 45°, Round |

[A] Strap width was measured at 9.67 mm and 51.01 mm diameter, respectively.

Bottles with the Design 1 and Design 2 base designs were tested for stress crack performance using the ISBT (International Society of Beverage Technologist) stress cracking method (issue date: 10/03; revision: 1). In the ISBT stress cracking method, 250 mL CSD containers (9.6 g) were blown with two different base designs. Stress crack resistance was measured as time to failure when exposed to a 0.2% caustic solution. This stress cracking test is particularly challenging, because the ISBT protocol calls for empty bottles to be conditioned at 50° C. for 24 hours, followed by conditioning at 22° C. for at least 16 hours as shown in the table above. Bottles are then filled with still water and pressurized with compressed air at 77 psi, and then immersed in a 0.2% caustic solution. A bottle passes the ISBT stress crack test if it does not fail within 5 following pressurization and immersion in caustic. Therefore, developing a pressure resistant base at low base weights is particularly challenging, because the performance requirements for the light weight base are the same as the performance requirements for conventional CSD packages.

Using the ISBT stress cracking method, the average time to failure for these base designs was as follows:

Design 1, 14.5 minutes

Design 2, less than 2 minutes

Stress cracking depends on a multitude of factors such as base design, the particular resin IV (intrinsic viscosity), specific processing conditions, the material distribution, the stress induced during blow molding process, and the like. As shown herein, the base design plays a key role in Stress Crack performance, as well as material characteristics.

Example 1B. Thickness Distribution in the Design 1 and Design 2 Bases

Thickness distribution in the base of the Design 1 and Design 2 bottle bases was measured at various locations from the gate. FIG. 3 illustrates the results of the base thickness (mm) plotted against the distance from the gate (mm), for both the Design 1 and Design 2 bottle bases and demonstrates the substantially increased thickness of the Design 2 bottle base near the gate as compared the Design 1 bottle base.

This thickness profile in the Design 1 and Design 2 bases demonstrates that Design 1 has lower thickness at the gate and is less likely to develop crazes under stress. This feature translates into better drop impact and stress crack performance of Design 1 over Design 2

Example 1C. Crystallinity Distribution in the Design 1 and Design 2 Bases

The crystallinity distribution in the base of the Design 1 and Design 2 bottle bases was measured at various locations from the gate along a vertical cross section, using a density gradient column. FIG. 4 illustrates the results of the percent (%) crystallinity plotted against the distance from the gate (mm) of the sample flake used to test crystallinity, for both the Design 1 and Design 2 bottle bases. The higher orientation in the base results in increased density enhances base performance.

Example 2A. Base Performance, Orientation and Cystallinity in Different Base Designs This example correlates orientation and crystallinity in different base designs according to this disclosure with the base performance. FIG. 5 and FIG. 6 provide percent (%) trans content data and percent (5) crystallinity, respectively, for following bottle bases: 9.3 g 200 mL PET new design bottle (♦) (B2); 200 mL PET standard (conventional) design bottle (■) (C1); and 300 mL standard (conventional) design bottle (▲) (C3).

Example 2B. Base Performance in Different Base Designs

The following table also summarizes performance results of different new and standard base designs, which is considered along with the orientation and crystallinity in the figures. As seen, the 9.3 g base new Design 1 bottle fabricated according to this disclosure was found to have a higher crystallinity and orientation as compared to the standard petaloid design (200 mL) and champagne base design (200 mL). This higher orientation and crystallinity stabilizes the light weight base and provides equivalent or better base performance.

TABLE 8

Base Performance, Orientation and Cystallinity in different base designs

| PerformanceFeature | 250 mL New Design 1 | 200 mL Std Design Petaloid | 200 mL Std Design Champagne |
|---|---|---|---|
| Base Clearance (Thermal Stability) | 0.60 | — | — |
| Drop failures | None | None | None |
| Rocker bottoms | None | None | None |
| Stress Crack, min | 14:58 | — | — |

Example 3. Light Weight Base Performance Comparison

Light-weight 250 mL and 300 mL bottles were blown with DAK B92A resin on a Sidel SBO-8 for evaluation. Performance evaluation was done using standard tests and the following table sets out some of the base performance parameters for the light weight bottles and bases fabricated according to this disclosure.

TABLE 9

Light weight Base Performance comparison:

| PerformanceFeature | 250 mL PET New Design 2 | 300 mL PET New Design 1 |
|---|---|---|
| Bottle Weight | 9.6 g | 9.95 g |
| Base Weight | 1.9 g | 1.8 g |
| Base Clearance (Thermal Stability) | 0.92 mm | 0.59 mm |
| Drop failures | None | None |
| Rocker bottoms | None | None |
| Stress Crack (min:sec) | 2:46 | 3:27 |

The differences in the base design for the two sizes are summarized in the following table.

TABLE 10

Selected base dimensions for two light-weight (250 mL and 300 mL) bottles

| Description | Parameter 250 mL 250 mL PET New Design | 300 mL 300 mL PET New Design |
|---|---|---|
| Base height (mm) | 20 | 21 |
| Base clearance (mm) | 2.25 | 2.5 |
| Standing ring diameter (mm) | 39.22 | 41.08 |
| Strap width near gate (mm) | 4 | 4 |
| Strap width near top (mm) | 4 | 4 |
| Gate pad diameter (mm) | 4.9 | 5 |
| Strap Cutter Angle (°) | 60 | 60 |
| Strap Angle, from Horizontal (°) | 40 | 39 |

Both the 250 mL and 300 mL base designs had a similar profile as the original 250 mL Design 1 bottle with the exception of the gate pad diameter. Density/Crystallinity measurements were made on these bases using standard ASTM methods. FIG. 7 shows the percent (%) crystallinity (by weight fraction) plotted against the distance from the gate (mm) of the sample flake used to test crystallinity, for these two test bottle bases set out in the table above, a 250 mL (▲) and a 300 mL (●). These results show that both bottles have a similar crystallinity distribution and their performance on stress crack testing was also similar.

These results also show that the stress crack test performance for both of these designs was not as good as the original 250 mL Design 1 bottle base. One notable difference between the Design 1 bottle and the 250 mL and 300 mL bottles of this Example is the gate pad diameter. Both of these designs have a smaller gate pad diameter as compared to that of Design 1, which suggests that the amorphous material around the gate is subjected to deformation, resulting in an increased propensity for craze initiation and subsequent failure during stress crack testing.

The disclosures of various publications may be referenced throughout this specification, which are hereby incorporated by reference in pertinent part in order to more fully describe the state of the art to which the disclosed subject matter pertains. To the extent that any definition or usage provided by any document incorporated herein by reference conflicts with the definition or usage provided herein, the definition or usage provided herein controls.

Throughout the specification and claims, the word "comprise" and variations of the word, such as "comprising" and "comprises," means "including but not limited to," and is not intended to exclude, for example, other additives, components, elements, or steps. While methods and features are described in terms of "comprising" various steps or components, these methods and features can also "consist essentially of" or "consist of" the various steps or components.

Unless indicated otherwise, when a range of any type is disclosed or claimed, for example a range of the percentages, diameters, weights, and the like, it is intended to disclose or claim individually each possible number that such a range could reasonably encompass, including any sub-ranges or combinations of sub-ranges encompassed therein. When describing a range of measurements such as these, every possible number that such a range could reasonably encompass can, for example, refer to values within the range with one significant figure more than is present in the end points of a range, or refer to values within the range with the same number of significant figures as the end point with the most significant figures, as the context indicates or permits. For example, when describing a range of percentages such as from 85% to 95%, it is understood that this disclosure is intended to encompass each of 85%, 86%, 87%, 88%, 89%, 90%, 91%, 92%, 93%, 94%, and 95%, as well as any ranges, sub-ranges, and combinations of sub-ranges encompassed therein. Applicants' intent is that these two methods of describing the range are interchangeable. Accordingly, Applicants reserve the right to proviso out or exclude any individual members of any such group, including any sub-ranges or combinations of sub-ranges within the group, if for any reason Applicants choose to claim less than the full measure of the disclosure, for example, to account for a reference that Applicants are unaware of at the time of the filing of the application.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed herein, and that each value is also herein disclosed as "about" that particular value in addition to the value itself. In aspects, "about" can be used to mean within 10% of the recited value, within 5% of the recited value, or within 2% of the recited value.

In any application before the United States Patent and Trademark Office, the Abstract of this application is provided for the purpose of satisfying the requirements of 37 C.F.R. § 1.72 and the purpose stated in 37 C.F.R. § 1.72(b) "to enable the United States Patent and Trademark Office and the public generally to determine quickly from a cursory inspection the nature and gist of the technical disclosure." Therefore, the Abstract of this application is not intended to be used to construe the scope of the claims or to limit the scope of the subject matter that is disclosed herein. Moreover, any headings that are employed herein are also not intended to be used to construe the scope of the claims or to limit the scope of the subject matter that is disclosed herein. Any use of the past tense to describe an example otherwise indicated as constructive or prophetic is not intended to reflect that the constructive or prophetic example has actually been carried out.

Those skilled in the art will readily appreciate that many modifications are possible in the exemplary embodiments disclosed herein without materially departing from the novel teachings and advantages according to this disclosure. Accordingly, all such modifications and equivalents are intended to be included within the scope of this disclosure as defined in the following claims. Therefore, it is to be understood that resort can be had to various other aspects, embodiments, modifications, and equivalents thereof which, after reading the description herein, may suggest themselves to one of ordinary skill in the art without departing from the spirit of the present disclosure or the scope of the appended claims.

Applicants reserve the right to proviso out any selection, feature, range, element, or aspect, for example, to limit the scope of any claim to account for a prior disclosure of which Applicants may be unaware.

The following numbered aspects of this disclosure are provided, which state various attributes, features, and embodiments of the present invention both independently, or in any combination when the context allows. That is, as the context allows, any single numbered aspect and any combination of the following numbered aspects provide various attributes, features, and embodiments of the present disclosure.

1. A lightweight base for a carbonated soft drink (CSD) container, wherein the base is characterized by the following features:
   a) an area/weight ratio (A/W), wherein A/W is from about 2200 to about 3400 sq mm/g;
   b) a weight percentage/area percentage ratio (W %/A %), wherein W %/A % is from about 0.90 to about 1.30;
   c) a first percent (%) crystallinity measured around the gate diameter (within 10 mm), wherein the first percent crystallinity is greater than or about 10%;
   d) a second percent (%) crystallinity measured at a distance of greater than or about 15 mm from the gate, wherein the second percent crystallinity is at least or about 70% of the sidewall crystallinity;
   e) a percent (%) trans content measured around the gate diameter (within 10 mm), wherein the percent trans content is at least or about 65%; and/or f) a thickness ratio (thickness at 5 mm from gate dividing by thickness at 10 millimeters from the gate) of less than or about 3.5.

2. A lightweight base for a carbonated soft drink (CSD) container according to the previous aspect, wherein A/W is from about 2600 to 3200 sq mm/g.

3. A lightweight base for a carbonated soft drink (CSD) container according to any of the previous aspects as the context allows, wherein W %/A % is from about 1.00 to 1.15.

4. A lightweight base according to any of the previous aspects as the context allows, wherein the first percent crystallinity is greater than or about 12%.

5. A lightweight base according to any of the previous aspects as the context allows, wherein the second percent crystallinity is at least or about 80% of the sidewall crystallinity.

6. A lightweight base according to any of the previous aspects as the context allows, wherein the percent trans content is at least or about 70%.

7. A lightweight base according to any of the previous aspects as the context allows, wherein the thickness ratio is less than or about 2.5.

8. A lightweight base according to any of the previous aspects as the context allows, wherein the base is a petaloid base.

9. A lightweight base according to any of the previous aspects as the context allows, wherein the base is a champagne base.

10. A lightweight base according to any of the previous aspects as the context allows, wherein the base passes an Stress Crack test protocol according to the ISBT stress cracking method 11. A lightweight base according to any of the previous aspects as the context allows, wherein the average time to failure in an Stress Crack performance test using the ISBT stress cracking method is greater than or about 5 minutes.

12. A lightweight base according to any of the previous aspects as the context allows, wherein the average time to failure in an Stress Crack performance test using the ISBT stress cracking method is great than or about 10 minutes.

13. A lightweight base according to any of the previous aspects as the context allows, wherein the base passes a 6-foot drop test (industry standard).

14. A lightweight base according to any of the previous aspects as the context allows, wherein the base maintains a base clearance of at least or about 0.5 mm following a thermal stability test (conditioning a 4.2 volume carbonated container at 38° C. for 24 hours).

15. A lightweight base according to any of the previous aspects as the context allows, wherein the base is further characterized by a heel diameter/standing ring ratio of less than or about 1.45.

16. A lightweight base according to any of the previous aspects as the context allows, wherein the base is further characterized by a heel diameter/standing ring ratio of less than or about 1.40.

17. A lightweight base according to any of the previous aspects as the context allows, wherein the base is further characterized by a gate pad diameter of greater than or about 7 mm.

18. A lightweight base according to any of the previous aspects as the context allows, wherein the base is further characterized by a strap width of greater than or about 3.5 mm.
19. A lightweight base according to any of the previous aspects as the context allows, wherein the base is further characterized by a strap width of greater than or about 4 mm.
20. A lightweight base for a carbonated soft drink (CSD) container, wherein the base is characterized by any four of the following the following features:
   a) an area/weight ratio (A/W), wherein A/W is from about 2200 to about 3400 sq mm/g;
   b) a weight percentage/area percentage ratio (W %/A %), wherein W %/A % is from about 0.90 to about 1.30;
   c) a first percent (%) crystallinity measured around the gate diameter (within 10 mm), wherein the first percent crystallinity is greater than or about 10%;
   d) a second percent (%) crystallinity measured at a distance of greater than or about 15 mm from the gate, wherein the second percent crystallinity is at least or about 70% of the sidewall crystallinity;
   e) a percent (%) trans content measured around the gate diameter (within 10 mm), wherein the percent trans content is at least or about 65%; and/or
   f) a thickness ratio (thickness at 5 mm from gate dividing by thickness at 10 millimeters from the gate) of less than or about 3.5.
21. A lightweight base according aspect 20, wherein the base is characterized by any five of the six recited features:
22. A carbonated soft drink (CSD) container comprising a lightweight base according to any one of the previous aspects.
23. A packaged shelf product comprising a carbonated soft drink (CSD) container according to aspect 22.

We claim:

1. A carbonated soft drink (CSD) container comprising a lightweight base and a sidewall, wherein the base and the sidewall each comprise a polymer having a crystallinity, wherein the base is characterized by the following features: a) an area/weight ratio (A/W), wherein A/W is from about 2200 to about 3400 sq mm/g; b) a weight percentage/area percentage ratio (W %/A %), wherein the weight percentage is the weight of the base relative to the container and the area percentage is the surface area of the base relative to the container, wherein W %/A % is from about 0.90 to about 1.30; c) a first percent (%) crystallinity measured around a diameter of a gate (within 10 mm), wherein the first percent crystallinity is greater than or about 10%; d) a second percent (%) crystallinity measured at a distance of greater than or about 15 mm from the gate, wherein the second percent crystallinity is at least or about 70% of the sidewall crystallinity; e) a percent (%) trans content measured around the gate diameter (within 10 mm), wherein the percent trans content is at least or about 65% and the trans content refers to the rotational trans isomer of the polymer; and f) a thickness ratio (thickness at 5 mm from the gate dividing by thickness at 10 millimeters from the gate) of less than or about 3.5.

2. The lightweight base according to claim 1, wherein A/W is from about 2600 to about 3200 sq mm/g.

3. The lightweight base according to claim 1, wherein W %/A % is from about 1.00 to about 1.15.

4. The lightweight base according to claim 1, wherein the first percent crystallinity is greater than or about 12%.

5. The lightweight base according to claim 1, wherein the second percent crystallinity is at least or about 80% of the sidewall crystallinity.

6. The lightweight base according to claim 1, wherein the percent trans content is at least or about 70%.

7. The lightweight base according to claim 1, wherein the thickness ratio is less than or about 2.5.

8. The lightweight base according to claim 1, wherein the base is a petaloid base.

9. The lightweight base according to claim 1, wherein the base is a champagne base.

10. The lightweight base according to claim 1, wherein the base passes an Stress Crack test protocol according to the ISBT stress cracking method.

11. The lightweight base according to claim 1, wherein the average time to failure in an Stress Crack performance test using the ISBT stress cracking method is greater than or about 5 minutes.

12. The lightweight base according to claim 1, wherein the average time to failure in an Stress Crack performance test using the ISBT stress cracking method is greater than or about 10 minutes.

13. The lightweight base according to claim 1, wherein the base passes a 6-foot drop test (industry standard).

14. The lightweight base according to claim 1, wherein the base maintains a base clearance of at least or about 0.5 mm following a thermal stability test (conditioning a 4.2 ounce volume carbonated container at 38° C. for 24 hours).

15. The lightweight base according to claim 1, wherein the base is further characterized by a heel diameter/standing ring ratio of less than or about 1.45.

16. The lightweight base according to claim 1, wherein the base is further characterized by a heel diameter/standing ring ratio of less than or about 1.40.

17. The lightweight base according to claim 1, wherein the base is further characterized by a gate pad diameter of greater than or about 7 mm.

18. The lightweight base according to claim 1, wherein the base is further characterized by a strap width of greater than or about 3.5 mm.

19. The lightweight base according to claim 1, wherein the base is further characterized by a strap width of greater than or about 4 mm.

20. A packaged shelf product comprising the carbonated soft drink (CSD) container according to claim 1.

21. A carbonated soft drink (CSD) container comprising a lightweight base and a sidewall, wherein the base and the sidewall each comprise a polymer having a crystallinity, wherein the base is characterized by any four of the following features: a) an area/weight ratio (A/W), wherein A/W is from about 2200 to about 3400 sq mm/g; b) a weight percentage/area percentage ratio (W %/A %), wherein the weight percentage is the weight of the base relative to the container and the area percentage is the surface area of the base relative to the container, wherein W %/A % is from about 0.90 to about 1.30; c) a first percent (%) crystallinity measured around a diameter of a gate (within 10 mm), wherein the first percent crystallinity is greater than or about 10%; d) a second percent (%) crystallinity measured at a distance of greater than or about 15 mm from the gate, wherein the second percent crystallinity is at least or about 70% of the sidewall crystallinity; e) a percent (%) trans content measured around the gate diameter (within 10 mm), wherein the percent trans content is at least or about 65% and the trans content refers to the rotational trans isomer of the polymer; and f) a thickness ratio (thickness at 5 mm from the gate dividing by thickness at 10 millimeters from the gate) of less than or about 3.5.

22. The lightweight base according to claim 21, wherein the base is characterized by any five of the six recited features.

* * * * *